US008330600B2

(12) United States Patent
Roeder et al.

(10) Patent No.: US 8,330,600 B2
(45) Date of Patent: Dec. 11, 2012

(54) COLD NOISE SOURCE SYSTEM

(75) Inventors: Robert S. Roeder, Dunedin, FL (US); Kenneth A. O'Connor, Sarasota, FL (US); Matthew C. Smith, Largo, FL (US); Shawn K. O'Brien, St. Petersburg, FL (US)

(73) Assignee: Raytheon Company, Waltham, MA (US)

( * ) Notice: Subject to any disclaimer, the term of this patent is extended or adjusted under 35 U.S.C. 154(b) by 1292 days.

(21) Appl. No.: 11/947,650

(22) Filed: Nov. 29, 2007

(65) Prior Publication Data
US 2008/0246669 A1 Oct. 9, 2008

Related U.S. Application Data

(60) Provisional application No. 60/867,746, filed on Nov. 29, 2006.

(51) Int. Cl.
G08B 19/00 (2006.01)

(52) U.S. Cl. .................. 340/552; 250/493.1; 250/494.1; 250/495.1; 250/496.1; 250/497.1; 374/1; 374/2; 374/3; 374/18; 342/27; 342/73; 342/74; 342/75; 342/81; 342/118; 342/147; 342/175

(58) Field of Classification Search .................. 340/351, 340/552; 250/493.1, 494, 1, 495.1, 496.1, 250/497.1, 498.1; 374/1–3, 18; 342/27, 342/73–81, 118, 147, 175
See application file for complete search history.

(56) References Cited

U.S. PATENT DOCUMENTS

| | | | |
|---|---|---|---|
| 6,137,440 A | 10/2000 | Roeder et al. | |
| 6,217,210 B1 | 4/2001 | Roeder et al. | |
| 6,222,479 B1 * | 4/2001 | Honigsbaum | 342/13 |
| 6,225,955 B1 * | 5/2001 | Chang et al. | 343/720 |
| 6,439,763 B2 | 8/2002 | Roeder et al. | |
| 6,834,991 B2 | 12/2004 | Roeder | |
| 2007/0115762 A1 * | 5/2007 | Wisnudel et al. | 369/13.56 |
| 2008/0129500 A1 | 6/2008 | Mafune et al. | |

FOREIGN PATENT DOCUMENTS

| | | |
|---|---|---|
| WO | WO 98/27414 | 11/1997 |
| WO | WO 2005/045473 A1 | 5/2005 |

OTHER PUBLICATIONS

PCT Notification of Transmittal of The International Search Report and the Written Opinion of the International Searching Authority, or the Declaration, International Application No. PCT/US2007/085935, dated Apr. 29, 2008, 13 pages.

Narayana, et al., "Radar penetration imaging using ultra-wideband (UWB) random noise waveforms", IEEE Proc.-Radar Sonar Navig., vol. 151, No. 3, Jun. 2004, pp. 143-148.

Narayana, et al., "Simulation of a Polarimetric Random Noise/Spread Spectrum Radar for Subsurface Probing Applications", IEEE, 1994, pp. 2494-2498.

Japanese Office Action for Application No. 2009-539486 filed on Jun. 15, 2012 with copy of English Translation of Office Action.

* cited by examiner

*Primary Examiner* — George Bugg
*Assistant Examiner* — Ojiako Nwugo
(74) *Attorney, Agent, or Firm* — Daly, Crowley, Mofford & Durkee, LLP

(57) ABSTRACT

In one embodiment, a system includes a first cold noise source, a first radiometer receiver, and a first detector. The first cold noise source generates a first thermal radiation signal having a first carrier frequency band. The first thermal radiation signal carries a first information signal. The first cold noise source also transmits the first thermal radiation signal through a first antenna. The first radiometer receiver receives the first thermal radiation signal through a second antenna, and the first detector extracts the first information signal from the first thermal radiation signal.

22 Claims, 5 Drawing Sheets

COLD NOISE SOURCE SYSTEM

RELATED APPLICATIONS

This application claims priority to U.S. Patent Application Ser. No. 60/867,746, entitled "COMMUNICATION LINK USING A MICROWAVE ACTIVE NOISE SOURCE," which was filed on Nov. 29, 2006.

TECHNICAL FIELD OF THE DISCLOSURE

This disclosure generally relates to communication devices, and more particularly to a system using a cold noise source and a method of operating the same.

BACKGROUND OF THE DISCLOSURE

Radiometers measure electro-magnetic radiation emitted from an object. Millimeter wave radiometers generally measure electro-magnetic radiation in the millimeter frequency range, typically at wavelengths above microwave bands and below the infrared radiation spectrum.

SUMMARY OF THE DISCLOSURE

In one embodiment, a system includes a first cold noise source, a first radiometer receiver, and a first detector. The first cold noise source generates a first thermal radiation signal having a first carrier frequency band. The first thermal radiation signal carries a first information signal. The first cold noise source also transmits the first thermal radiation signal through a first antenna. The first radiometer receiver receives the first thermal radiation signal through a second antenna, and the first detector extracts the first information signal from the first thermal radiation signal.

Particular embodiments of the present disclosure may exhibit some, none, or all of the following technical advantages. For example, various embodiments may provide a communication path for which signal interception may be readily detected. If an intruding object is placed in the communication path to intercept a signal, the communication path is broken, which could trigger an alarm.

Other technical advantages will be readily apparent to one skilled in the art from the following figures, description, and claims.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Known wireless systems transmit information from one location to another using electro-magnetic radiation. Security of these systems, however, may be limited because others can intercept the electro-magnetic radiation. Signal scrambling techniques, such as data encryption or frequency hopping, may be used to improve security. These scrambling techniques, however, utilize active electro-magnetic radiation that may be detectable and/or decipherable.

Figure 1:
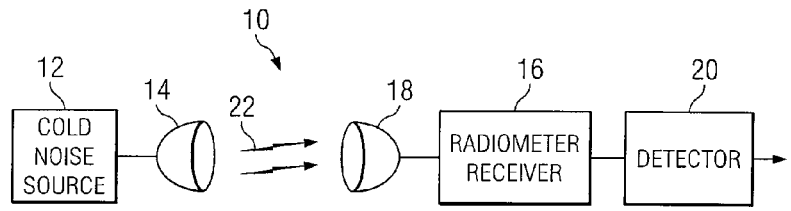
FIG. 1 illustrates one embodiment of a system according to the teachings of the present disclosure.

FIG. 1 illustrates one embodiment of a system 10 according to the teachings of the present disclosure. System 10 generally includes a cold noise source 12 coupled to an antenna 14, and a radiometer receiver 16 coupled to an antenna 18 and a detector 20 as shown. In one example of operation, cold noise source 12 generates a thermal radiation signal 22 that is transmitted through antenna 14. Thermal radiation signal 22 carries an information signal and may traverse along any suitable line-of-sight path from transmitting antenna 14 to its associated receiving antenna 18. Radiometer receiver 16 receives thermal radiation signal 22 through antenna 18. Detector 20 extracts the information signal from thermal radiation signal 22.

Cold noise source 12 emits electro-magnetic radiation at cold temperatures. An example of a cold temperature range may be 50 to 300 degrees Kelvin, such as 50 to 200, 100 to 300, or 100 to 200 degrees Kelvin.

In one embodiment, cold noise source 12 may be a solid state device, such as a field-effect-transistor that simulates electro-magnetic radiation emitted from a cold thermal body. The field-effect-transistor has an exposed active region. When current is passed through the active region, the active region emits electro-magnetic radiation. The active region may be designed to emit electro-magnetic radiation at particular wavelengths that simulate the temperature of the thermal body. By varying current through the active region, the wavelengths of the electro-magnetic radiation, and thus the simulated temperature, may be changed.

The field-effect-transistor (FET) may simulate a hot radiation noise temperature "Tw" and/or a cold radiation noise temperature "Tc". Noise temperature $\Phi$ is the noise power spectral density at a specified frequency and is derived from Planck's blackbody formula. The average energy $\langle \epsilon \rangle$ of an oscillator at a temperature T is:

$$\langle \epsilon \rangle = \frac{hf}{e^{(hf/kt)} - 1} \qquad (1)$$

where:
f represents the frequency of operation;
h is Planck's constant; and
k represents the thermal conductivity.

Figure 2:
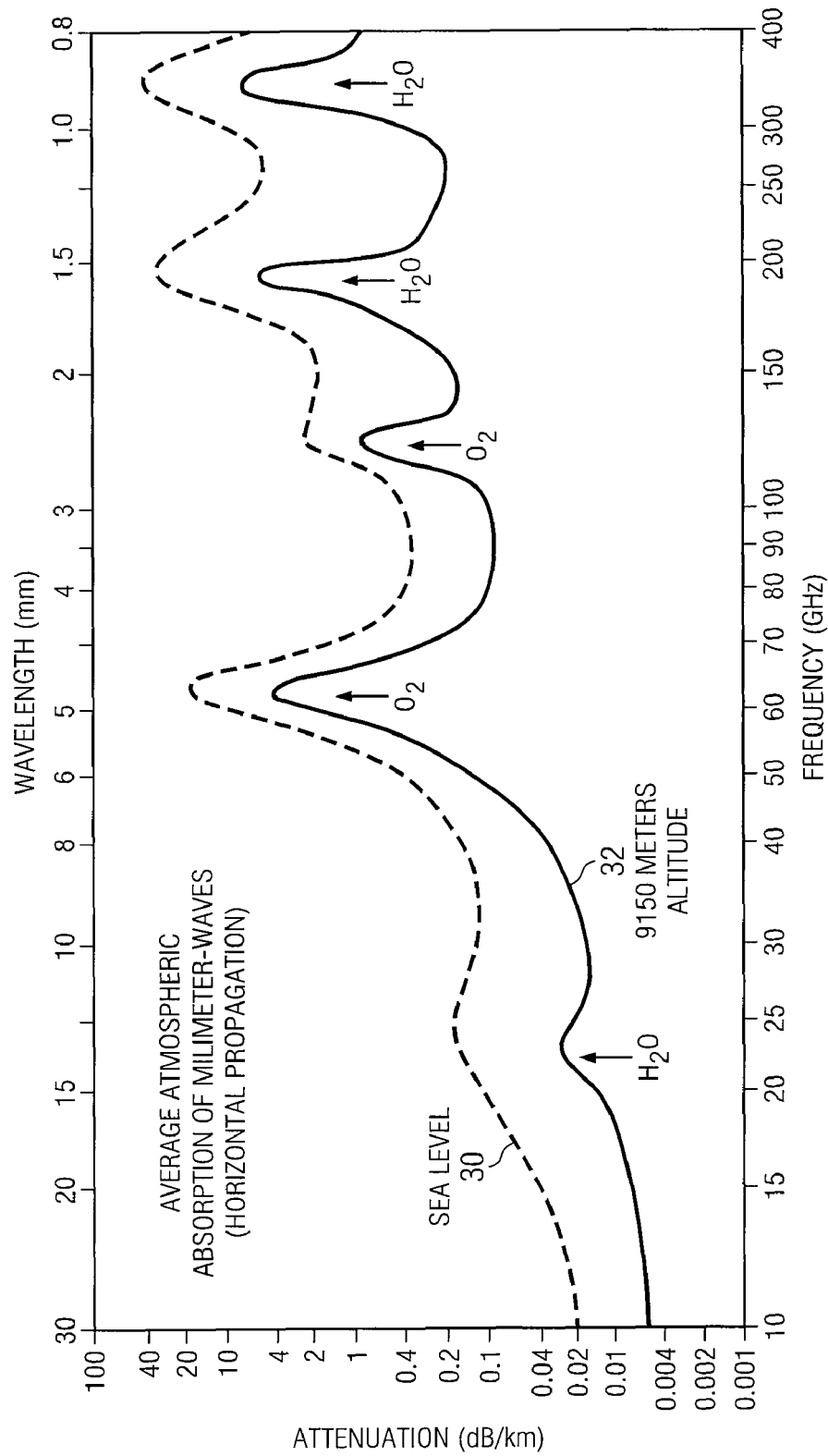
FIG. 2 illustrates examples of attenuation levels of thermal radiation signals due to various environmental phenomena at different operating frequencies.

At high temperatures and low frequencies, the average energy $\langle \epsilon \rangle$ approaches kT, so the power of a bandwidth B is P=kTB (Nyquist's formula). The noise temperature T is T=P/kB. Cold noise source 12 may transmit signal 22 at any suitable frequency. In one embodiment, a frequency that experiences less attenuation during transmission may be selected. FIG. 2 illustrates attenuation level at different frequencies.

FIG. 2 illustrates examples of relative attenuation levels of temperatures due to natural phenomena present in the atmosphere. Attenuation plot 30 shows relative attenuation that may occur over a range of frequencies at sea level. Attenuation plot 32 shows relative attenuation that may occur over a range of frequencies at approximately 9150 meters of altitude. Attenuation plots 30 and 32, illustrate that certain frequency ranges experience relatively less attenuation than other frequencies ranges. In the examples, the frequency ranges are generally centered around 35 Giga-Hertz, 94 Giga-Hertz, 140 Giga-Hertz, and 240 Giga-Hertz. Thus, thermal radiation signals 22 at and around these frequencies may experience relatively less attenuation than thermal radiation signals 22 at other frequencies.

Returning to FIG. 1, cold noise source 12 may generate thermal radiation signal 22 at approximately 35 Giga-Hertz, 94 Giga-Hertz, 140 Giga-Hertz, or 240 Giga-Hertz. In one example, the 240 Giga-Hertz frequency range may provide relatively good spatial resolution for a particular size of antenna. The atmospheric attenuation is higher at 240 Giga-Hertz than at the lower frequencies, but the higher spatial resolution may achieve relatively good signal-to-noise ratio in good weather with a range of greater than 100, 500, or 1000 feet, which may offset the higher attenuation.

Antennas 14 and 18 may have any suitable design that converts electrical signals into thermal radiation signal 22, and vice-versa. Examples of suitable types of antennas may include horn antennas, spiral antennas, and parabolic antennas. Antennas 14 and 18 may be remotely configured.

Detector 20 extracts the information signal from thermal radiation signal 22 received by radiometer receiver 16. As will be described in greater detail below, the information signal may be demodulated from thermal radiation signal 22, or the information signal may be an intrusion detection signal that is generated in response to loss of thermal radiation signal 22 by radiometer receiver 16.

Certain embodiments of system 10 may use a transmission medium that simulates a thermal body. This medium may be relatively difficult to detect apart from other thermal bodies. Thus, unwanted interception of thermal radiation signal 22 may be reduced.

Figure 3:
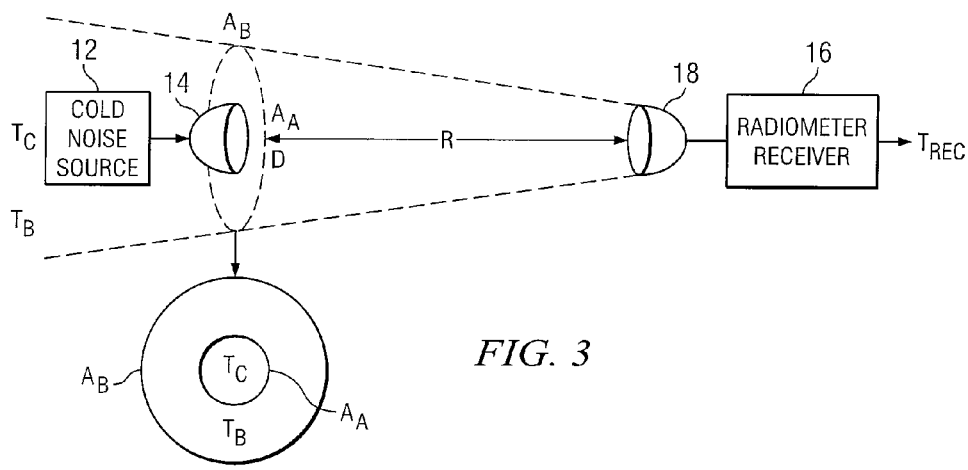
FIG. 3 illustrates examples of parameters that may affect the receiver output temperature of the radiometer receiver of the embodiment of FIG. 1.

FIG. 3 illustrates parameters involved in transmitting thermal radiation signal 22 from cold noise source 12 to radiometer receiver 16. The radiometer output temperature $T_{Rec}$ may be given by the formula:

$$T_{Rec} \approx E_{ML}\left[\frac{A_A}{A_B} \cdot T_C + \frac{(A_B - A_A)}{A_B} \cdot T_B\right] t_P \quad (2)$$

where:

$T_{Rec}$ represents the radiometer receiver's output temperature;

$E_{ML}$ represents the main lobe efficiency;

$A_A$ represents the aperture area of antenna 14;

$A_B$ represents beam intercept area at range R;

R represents the range or distance of antenna 14 from antenna 18;

$T_C$ represents the cold noise source temperature;

$T_B$ represents the background temperature; and $t_P$ represents the transmission coefficient over the range R.

In one example, a carrier frequency is 94 Giga-Hertz, antennas 14 and 16 have 8-inch diameters, the range separation is 500 feet, the main lobe efficiency is 97 percent (2.5×3 decibel (dB) beamwidth), and the cold noise source temperature Tc ranges from 100 degrees Kelvin to 300 degrees Kelvin. The corresponding $T_{Rec}$ for the two temperatures are 299.8 degrees Kelvin and 300 degrees Kelvin or a received temperature change of 0.2 degrees Kelvin. If radiometer receiver 16 has a noise figure of 4 decibels (dB), a bandwidth of 5 Giga-Hertz, and integration time of 0.1 seconds, the receiver sensitivity or minimum detectable temperature difference is 0.033 degrees Kelvin. The signal-to-noise ratio (SNR) is SNR=10 log(0.2K/0.033K)=7.8 decibels (dB).

Although formula (2) provides one mathematical model for approximating the receiver output temperature $T_{Rec}$ seen by radiometer receiver 16, other equations for modeling the receiver output temperature $T_{Rec}$ may be used to approximate the performance of system 10.

Figure 4:
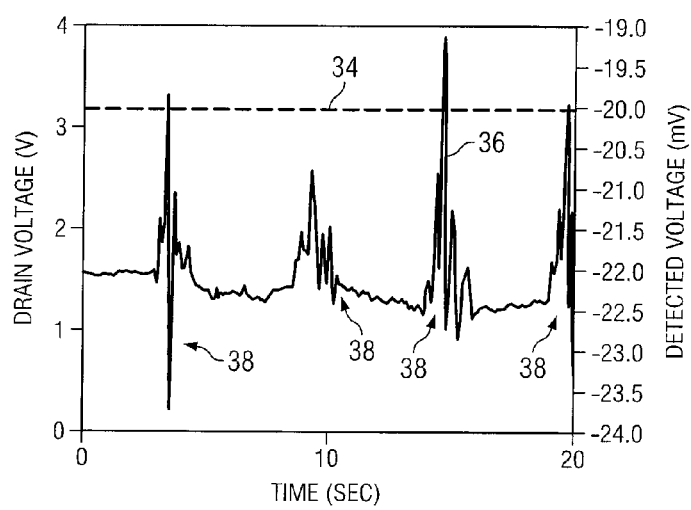
FIG. 4 illustrates an example of the operating characteristics of the system of FIG. 1.

FIG. 4 illustrates an example of the operating characteristics of system 10. The graph includes a drain voltage plot 34 and a detected voltage plot 36. Drain voltage plot 34 shows the voltage level applied to a drain terminal of a particular field-effect-transistor configured as cold noise source 12, and is directly proportional to the output power of cold noise source 12. Drain voltage plot 34 indicates that the output power of cold noise source 12 is relatively constant. Detected voltage plot 36 represents the thermal radiation signal 22 detected at detector 22. Detected voltage plot 36 has a number of regions 38 that fluctuate between −19.0 to −23.5 volts. These fluctuations are due to interruptions in thermal radiation signal 22 that occur between transmitting antenna 14 and receiving antenna 18. In this particular example, the interruptions are caused by a generally opaque object that is placed between transmitting antenna 14 and receiving antenna 18.

Figure 5:
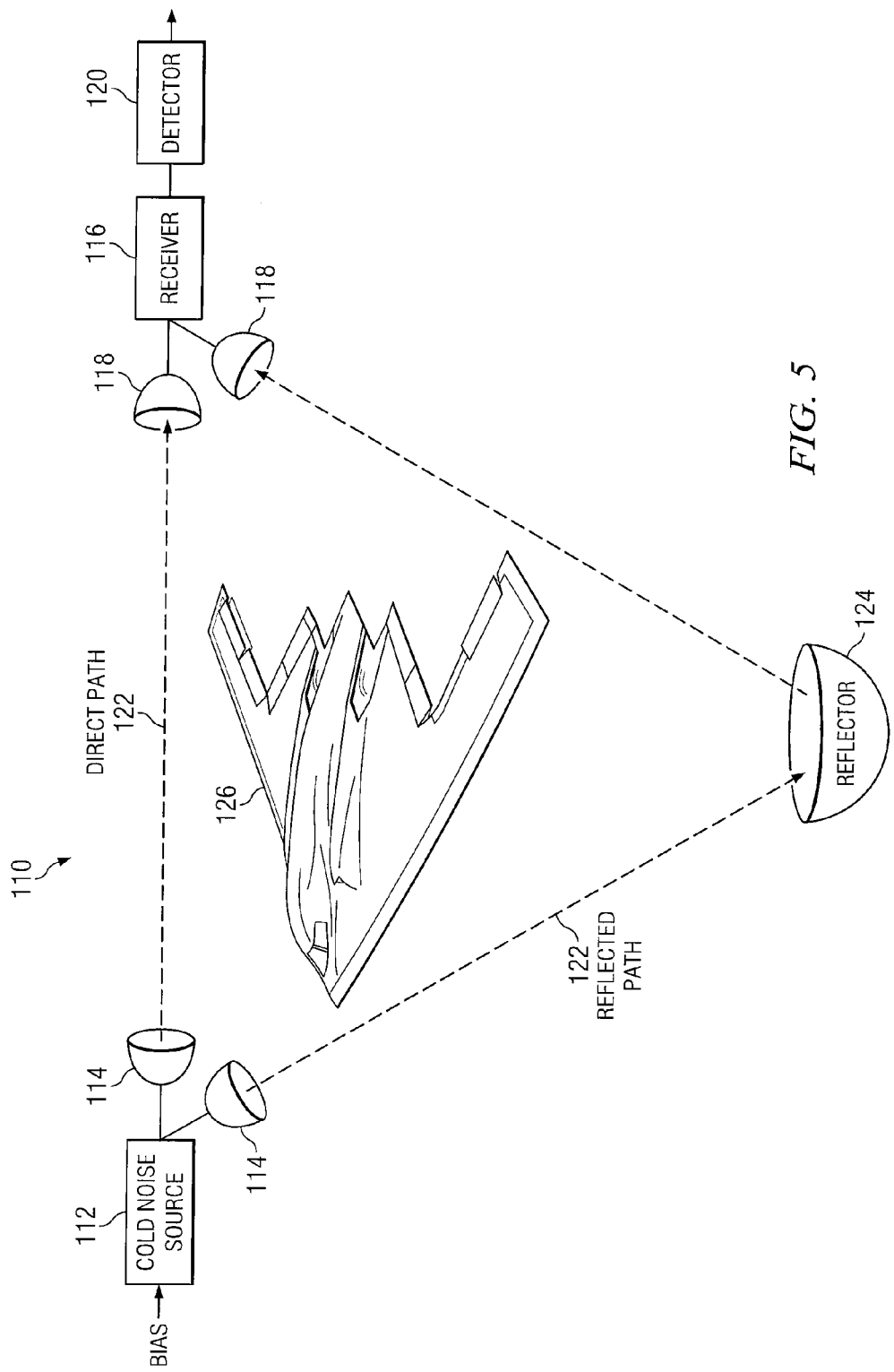
FIG. 5 illustrates another embodiment of a system according to the teachings of the present disclosure that is configured as an intrusion detection system.

FIG. 5 illustrates another embodiment of a system 110. In this particular embodiment, system 110 is implemented as an intrusion detection system. System 110 includes a cold noise source 112 coupled to a pair of transmitting antennas 114, a radiometer receiver 116 coupled to a pair of receiving antennas 118 and a detector 120, and a reflector 124. Cold noise source 112 generates thermal radiation signals 122. Thermal radiation signals 122 encompass an item, which in this embodiment is an aircraft 126. A disruption of thermal radiation signals 122 by an intruder triggers an alarm.

Detector 120 may detect disruptions in thermal radiation signals 122 and trigger an intrusion alarm. Any opaque object placed between a transmitting antenna 114 and its associated receiving antenna 118 may disrupt thermal radiation signal 122 and trigger an intrusion alarm. For example, an unauthorized person may disrupt a thermal radiation signal 122 by moving in between a transmitting antenna 114 and its associated receiving antenna 118.

In one embodiment, reflector 124 may reflect thermal radiation signal 122 along an angle. Reflector 124 may comprise an electrically conductive material. Reflector 124 may be oriented to reflect thermal radiation signal 122 from one transmitting antenna 114 to its associated receiving antenna 118.

Figure 6:
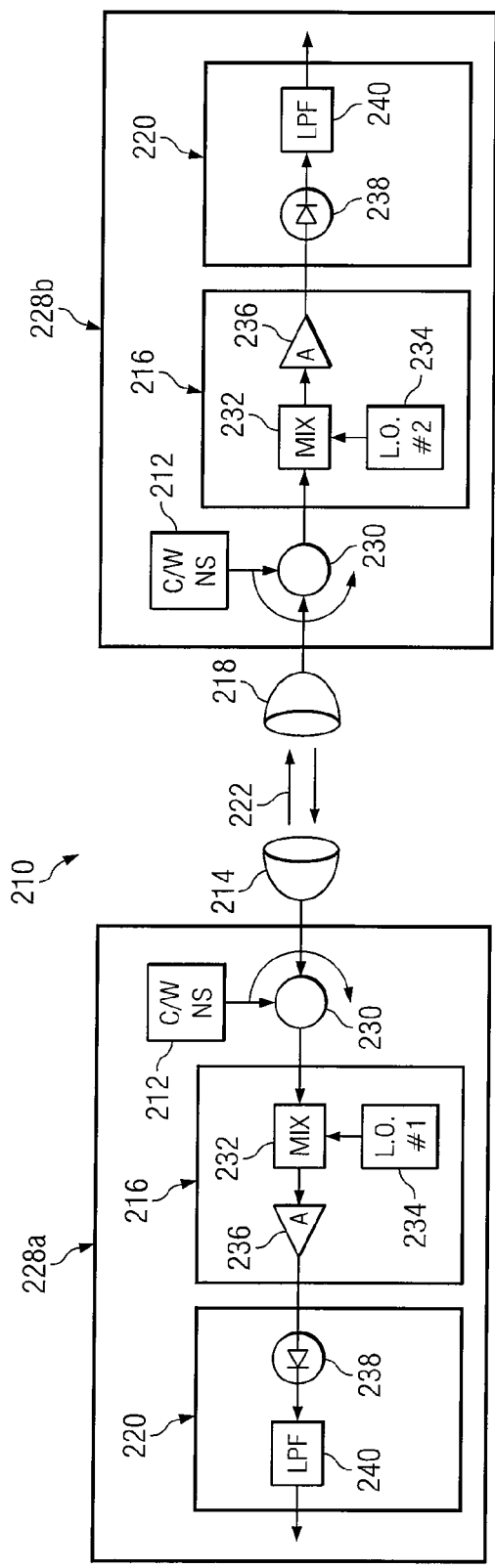
FIG. 6 illustrates another embodiment of a system according to the teachings of the present disclosure that is configured as a duplex communication system.

FIG. 6 illustrates another embodiment of a system 210 comprising a duplex communication link. System 210 has two nodes 228a and 228b that communicate with each other through corresponding antennas 214 and 218. System 210 may simultaneously transmit and receive thermal radiation signals 222 to and from either node 228.

Cold noise source 212 may modulate thermal radiation signal 222 in any suitable manner to encode the information signal in thermal radiation signal 222. In one embodiment, thermal radiation signal 222 is modulated by varying the thermal temperature of thermal radiation signal 222 to superimpose the information signal onto thermal radiation signal 222. In another embodiment, thermal radiation signal 222 may be modulated by deviating the brightness temperature of the carrier signal. In another embodiment, thermal radiation signal 222 may be modulated by pulse modulating thermal radiation signal 222.

Each node 228a and 228b has a cold noise source 212, a radiometer receiver 216, a waveguide circulator 230, and a detector 220 coupled as shown. Cold noise source 212 and radiometer receiver 216 are coupled to its respective antenna 214 or 218 through waveguide circulator 230. In one embodiment, waveguide circulator 230 is a low loss radio-frequency (RF) ferrite switch.

In the particular embodiment shown, radiometer receiver 216 comprises a super-heterodyne receiver that includes a mixer 232, a local oscillator 234, and an amplifier 236 coupled as shown. Mixer 232 mixes received thermal radiation signal 222 with a signal generated by local oscillator 234 to form an intermediate signal that is amplified by amplifier 236. Although in this embodiment, radiometer receiver 218 comprises a super-heterodyne receiver, radiometer receiver 218 may comprise any suitable type of receiver, such as a super-regenerative receiver, a tuned radio frequency receiver, or a direct detection receiver.

Detector 220 receives the output of radiometer receiver 216. In this particular embodiment, detector 220 has a demodulator 238 and a low-pass filter 240 coupled as shown. Demodulator 238 extracts the information signal from thermal radiation signal 222. In one embodiment, demodulator 238 is a voltage identification digital (VID) demodulator that produces a voltage according to a received digital signal carried by thermal radiation signal 222.

Figure 7:
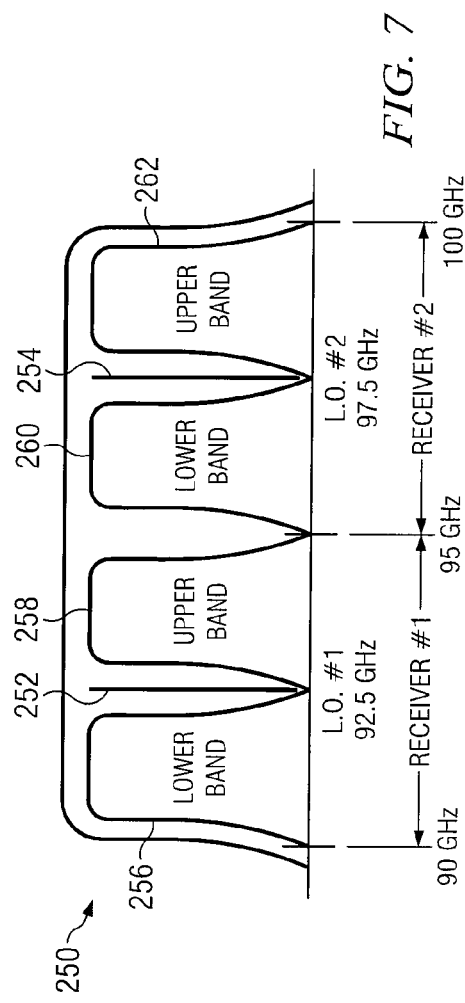
FIG. 7 illustrates one example of a spectral frequency pattern that may be generated by the system of FIG. 6.

FIG. 7 illustrates one example of a spectral frequency pattern 250 that may be generated by system 210. In this particular example, cold noise source 212 of one node 228a may have a carrier frequency 252 of 92.5 Giga-Hertz, and cold noise source 212 of node 228b may have a carrier frequency 254 of 97.5 Giga-Hertz. Mixer 232 of node 228a mixes local oscillator 234 with received thermal radiation signal 222 to yield a lower side lobe 256 and an upper side lobe 258. Mixer 232 of node 228b mixes local oscillator 234 with received thermal radiation signal 222 to yield a lower side lobe 260 and an upper side lobe 262.

Figure 8:
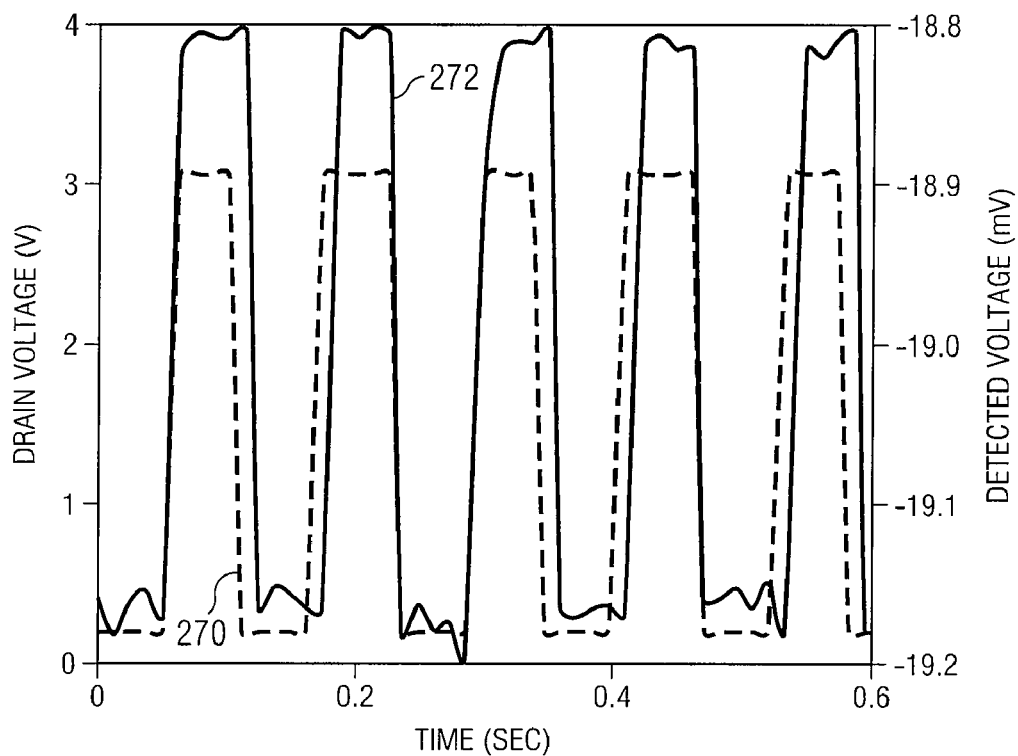
FIG. 8 illustrates an example of the operating characteristics of the system of FIG. 6.

FIG. 8 illustrates an example of operating characteristics of system 210. The graph includes a drain voltage plot 270 and a detected voltage plot 272. Drain voltage plot 270 indicates the relative output power of thermal radiation signal 222 generated by cold noise source 212. In this particular example, thermal radiation signal 222 is modulated by a square-wave signal that simulates an effective radiated temperature variation of 135 degrees Kelvin to 300 degrees Kelvin.

The modulation encodes the information signal in thermal radiation signal 222. Detected voltage plot 272 indicates the thermal radiation signal 222 detected by detector 220. Detected voltage plot 272 generally follows drain voltage plot 270. Accordingly, the information signal was substantially preserved throughout transmission.

Modifications, additions, or omissions may be made to system 10, 110, or 210 without departing from the scope of the disclosure. The components of system 10, 110, or 210 may be integrated or separated. For example, detector 20, 120, or 220 may be coupled to radiometer receiver 16, 116, or 216 or may form a portion of radiometer receiver 16, 116, or 216. Moreover, the operations of system 10, 110, or 210 may be performed by more, fewer, or other components. For example, each node 228 of system 210 may include a waveguide circulator 230 for coupling cold noise source 212 and radiometer receiver 216 to its respective antenna 214 or 218, or a waveguide circulator 230 may not be needed if cold noise source 212 and radiometer receiver 216 have their own dedicated antenna. As used in this document, "each" refers to each member of a set or each member of a subset of a set.

Figure 9:
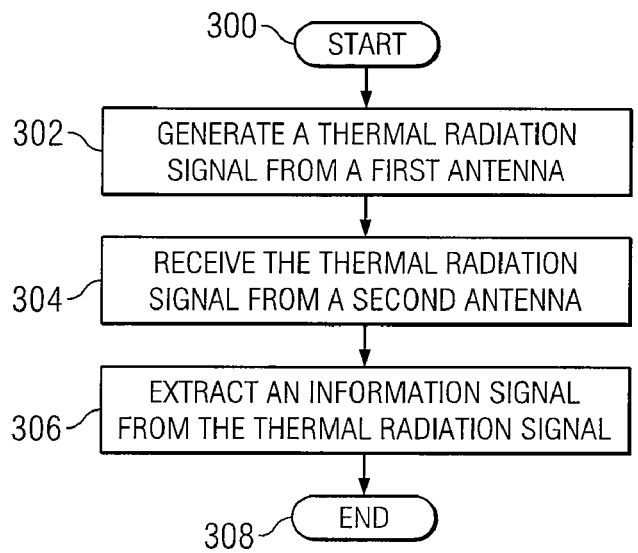
FIG. 9 illustrates one embodiment of a series of actions that may be performed by the system of FIG. 1, 5, or 6.

FIG. 9 illustrates one embodiment of a series of steps that may be performed by system 10, 110, or 210. In step 300, the method is initiated.

In step 302, cold noise source 12, 112, or 212 generates thermal radiation signal 22, 122, or 222 using transmitting antenna 14, 114, or 214. For system 10 or 110, thermal radiation signal 22 or 122 may have a constant amplitude and frequency. For system 210, thermal radiation signal 222 may be modulated with the information signal using amplitude modulation or pulse modulation.

In step 304, radiometer receiver 16, 116, or 216 receives thermal radiation signal 22, 122, or 222 and transmits thermal radiation signal 22, 122, or 222 through antenna 18, 118, or 218. Radiometer receiver 16, 116, or 216 may receive thermal radiation signal 22, 122, or 222 that progresses along any line-of-sight path. In one embodiment, thermal radiation signal is reflected along a line-of-sight path using reflector 124.

In step 306, detector 20, 120, or 220 extracts the information signal from thermal radiation signal 22, 122, or 222. For system 110, detector 122 generates an intrusion detection signal due to a momentary loss of thermal radiation signal 122. For system 210, detector 220 demodulates the information signal from the thermal radiation signal 222.

The previously described method continues throughout operation of the system 10, 110, or 210. When use of system 10, 110, or 210 is no longer needed or desired, the method is halted in step 308.

Modifications, additions, or omissions may be made to the method without departing from the scope of the disclosure. The method may include more, fewer, or other steps. For example, thermal radiation signal 222 may be modulated to encode the information signal in any suitable manner, such as by modulating the simulated temperature of cold noise source 212 or by modulating the amplitude of thermal radiation signal 222.

Although several embodiments have been illustrated and described in detail, it will be recognized that substitutions and alterations are possible without departing from the spirit and scope of the present disclosure, as defined by the following claims.

What is claimed is:

1. A system, comprising:
    a first cold noise source configured to:
        generate a first thermal radiation signal having a first carrier frequency band, the first thermal radiation signal carrying a first information signal; and
        transmit the first thermal radiation signal through a first antenna;
    a first radiometer receiver configured to: receive the first thermal radiation signal through a second antenna; and
    a first detector coupled to the first radiometer receiver, the first detector configured to:
    extract the first information signal from the first thermal radiation signal.

2. The system of claim 1, further comprising a modulator coupled to the first cold noise source, the modulator configured to:
    modulate the first thermal radiation signal to encode the first information signal in the first thermal radiation signal.

3. The system of claim 1, wherein the first detector is configured to extract the first information signal from the first thermal radiation signal by:

demodulating the thermal radiation signal to extract the first information signal from the thermal radiation signal.

4. The system of claim 1, wherein the first information signal is selected from the group consisting of an amplitude modulated signal and a pulse modulated signal.

5. The system of claim 1, wherein the first detector is configured to:
detect a break in the first thermal radiation signal; and
generate an intrusion detection signal in response to the detection.

6. The system of claim 1, further comprising:
a second cold noise source configured to:
generate a second thermal radiation signal having a second carrier frequency band, the second carrier frequency band being different from the first carrier frequency band, the second thermal radiation signal carrying a second information signal; and
transmit the second thermal radiation signal through the second antenna;
a second radiometer receiver configured to:
receive the second thermal radiation signal through the first antenna; and
a second detector coupled to the second radiometer receiver, the second detector configured to:
extract the second information signal from the second thermal radiation signal.

7. The system of claim 1, wherein the first antenna or the second antenna is selected from the group consisting of a horn antenna, a spiral antenna, and a parabolic antenna.

8. The system of claim 1, further comprising:
a reflector disposed between the first antenna and the second antenna, the reflector configured to reflect the first thermal radiation signal.

9. A method, comprising:
generating, by a first cold noise source, a first thermal radiation signal having a first carrier frequency band, the first thermal radiation signal carrying a first information signal;
transmitting the first thermal radiation signal through a first antenna;
receiving the first thermal radiation signal at a first radiometer receiver through a second antenna; and
extracting, by a first detector coupled to the first radiometer receiver, the first information signal from the first thermal radiation signal.

10. The method of claim 9, further comprising:
modulating, by a modulator coupled to the first cold noise source, the first thermal radiation signal to encode the first information signal in the first thermal radiation signal.

11. The method of claim 9, wherein extracting the first information signal from the first thermal radiation signal further comprises:
demodulating the thermal radiation signal to extract the first information signal from the thermal radiation signal.

12. The method of claim 9, wherein the first information signal is selected from the group consisting of an amplitude modulated signal and a pulse modulated signal.

13. The method of claim 9, further comprising:
detecting a break in the first thermal radiation signal; and
generating an intrusion detection signal in response to the detection.

14. The method of claim 9, further comprising:
generating, by a second cold noise source, a second thermal radiation signal having a second carrier frequency band, the second carrier frequency band being different from the first carrier frequency band, the second thermal radiation signal carrying a second information signal;
transmitting the second thermal radiation signal through the second antenna;
receiving the second thermal radiation signal at a second radiometer receiver through the first antenna; and
extracting, by a second detector coupled to the second radiometer receiver, the second information signal from the second thermal radiation signal.

15. The method of claim 9, wherein the first antenna or the second antenna is selected from the group consisting of a horn antenna, a spiral antenna, and a parabolic antenna.

16. The method of claim 9, further comprising:
reflecting the first thermal radiation signal using a reflector disposed between the first antenna and the second antenna.

17. A system, comprising:
a first cold noise source configured to:
generate a first thermal radiation signal having a first carrier frequency band, the first thermal radiation signal carrying a first information signal; and
transmit the first thermal radiation signal through a first antenna;
a first radiometer receiver configured to:
receive the first thermal radiation signal through a second antenna;
a first detector coupled to the first radiometer receiver, the first detector configured to:
extract the first information signal from the first thermal radiation signal;
a second cold noise source configured to:
generate a second thermal radiation signal having a second carrier frequency band, the second carrier frequency band being different from the first carrier frequency band, the second thermal radiation signal carrying a second information signal; and
transmit the second thermal radiation signal through the second antenna;
a second radiometer receiver configured to:
receive the second thermal radiation signal through the first antenna; and
a second detector coupled to the second radiometer receiver, the second detector configured to:
extract the second information signal from the second thermal radiation signal.

18. The system of claim 17, further comprising a modulator coupled to the first cold noise source, the modulator configured to:
modulate the first thermal radiation signal to encode the first information signal in the first thermal radiation signal.

19. The system of claim 17, wherein the first detector is configured to extract the first information signal from the first thermal radiation signal by:
demodulating the thermal radiation signal to extract the first information signal from the thermal radiation signal.

20. The system of claim 17, wherein the first detector is configured to:
detect a break in the first thermal radiation signal; and
generate an intrusion detection signal in response to the detection.

21. The system of claim 17, wherein the first antenna or the second antenna is selected from the group consisting of a horn antenna, a spiral antenna, and a parabolic antenna.

22. The system of claim 17, further comprising: a reflector disposed between the first antenna and the second antenna, the reflector configured to reflect the first thermal radiation signal.

* * * * *